United States Patent [19]

Easter, Jr. et al.

[11] 3,860,657

[45] Jan. 14, 1975

[54] PROCESS FOR THE PREPARATION OF CITRONELLAL

[75] Inventors: William M. Easter, Jr., Hasbrouck Heights; Julian Dorsky, Rockaway; Robert F. Tavares, Cedar Grove, all of N.J.

[73] Assignee: Givaudan Corporation, Clifton, N.J.

[22] Filed: Mar. 25, 1970

[21] Appl. No.: 22,658

[52] U.S. Cl.......... 260/601 R, 260/566 A, 260/602, 260/631.5
[51] Int. Cl............................................ C07c 47/20
[58] Field of Search......................... 260/601, 601 R

[56] References Cited
UNITED STATES PATENTS
3,393,237   7/1968   Forman et al. .................... 260/690

FOREIGN PATENTS OR APPLICATIONS
1,086,447   10/1967   Great Britain ................. 260/601 R

OTHER PUBLICATIONS

Ipatiew, Chem. Ber. Vol. 45, pages 3218–3224, 1912.

Primary Examiner—Joseph E. Evans
Assistant Examiner—Roscoe Liles
Attorney, Agent, or Firm—Thomas Cifelli, Jr.

[57] ABSTRACT

There is provided a novel process for selectively reducing citral to citronnellal by hydrogenation using wet palladium as catalyst in the presence of a base. It is a particular advantage of the process that citral from synthetic or natural sources may be employed to yield citronellal substantially free of byproducts.

11 Claims, No Drawings

PROCESS FOR THE PREPARATION OF CITRONELLAL

DESCRIPTION OF THE PRIOR ART

Citronellal is a very valuable ingredient of the perfumery and drug industry. It is convertible into hydroxycitronellal, isopulegol and menthol, which are valuable ingredients of perfume and flavor compositions, and in the drug industry and is found in Citronella Oil and other essential oils. The supply of citronellal from these natural sources is often subject to the vagaries common to agricultural products, such as poor crop years, political turmoil, hoarding, etc.

Prices fluctuate with these uncontrolled variables and industrial consumers frequently have great difficulty finding adequate quantities for their needs.

To avoid these problems, other sources of citronellal have been sought. Citral has always been considered to be an interesting raw material for citronellal. It is found in natural oils such as lemongrass oil and now is available at low cost from two synthetic routes, one starting with acetylene and the other with myrcene. However, it is difficult to convert citral to citronellal that is substantially free from undesirable by-products such as dimethyloctanal (DMA), citronellol, dimethyloctanol (DMO) and isopulegol. A very selective catalyst must be used so that of the two olefinic double bonds existing in the citral molecule in the 2 (allylic) and 6 positions, only the allylic double bond in the 2 position is reduced and the aldehyde group is not hydrogenated to the alcohols (citronellol and dimethyloctanol) and citronellal is not isomerized to isopulegol.

The following illustrate these reactions:

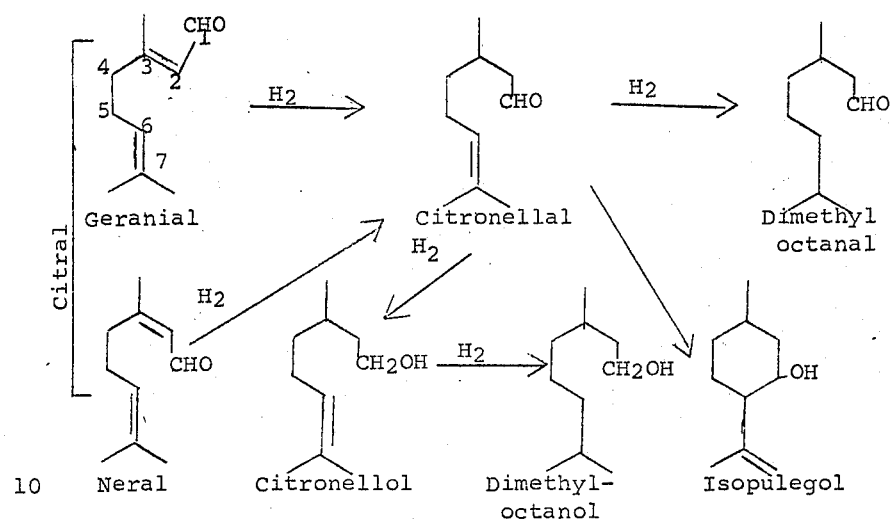

The prior art reports several processes for hydrogenating citral to citronellal but none is economically attractive because of the low yields of citronellal. Skita (Ber. 42, 1627–36.) hydrogenated an alcoholic solution of citral using as catalyst an aqueous solution of $PdCl_2$ containing gum arabic and obtained only a 33 percent yield of citronellal. Escourrou (Bull.Soc. Chem. 43, 1204–14.) used nickel catalyst but only obtained enough citronellal to identify by its semicarbazone. Bag and coworkers (Org. Chem. Ind. (U.S.S.R.) 2, 141–4 (1936) C.A. 31, 1006[9] (1937).) reported a 60 percent yield of citronellal from citral by hydrogenation with a Raney-type nickel catalyst prepared from an alloy containing 73 percent aluminum and 27 percent nickel. Slightly higher yields (64 – 69 percent) were reported by two other Russian workers (J. Applied Chem. (U.S.S.R.) 10, 119–25.) using this same catalyst system but under different conditions. Palfray (Bull. Soc. Chem. 7, 401–6 (1940).) attempted to hydrogenate citral selectivity with nickel catalyst but was only partially successful. His main product was 3,7-dimethyl-1 octanol (DMO). Sfiras and Demeilliers (Recherches (Roure-Bertrand fils & Justin Dupont) 1953, No. 3, 32) studied several Raney nickel catalysts containing cobalt for the hydrogenation of citral to citronellal. They reported yields of less than 75 percent.

SUMMARY OF THE INVENTION

Our invention provides an unexpected and greatly improved process for the hydrogenation of citral (neral & geranial) to citronellal having very little unreacted citral, a low content of DMA, and substantially no citronellol, isopulegol or DMO.

We have found that high yields of citronellal are obtained by hydrogenating citral with a palladium catalyst in the presence of small amounts of water and a base.

DESCRIPTION OF THE PREFERRED EMBODIMENTS

Palladium is conveniently used on a carrier or support such as carbon or alumina. Carriers containing from 1 to 10 percent palladium are commercially available and are satisfactory for this process. It is preferred to utilize 0.2 to 5 grams of 5 percent palladium on carbon or alumina per 100 grams of citral. To this is added the appropriate amount of water and base as discussed below.

Water must be present to achieve selective hydrogenation and high yields of citronellal. The minimum amount required is about 0.3 gram of water per hundred grams of citral. Larger amounts such as equal parts of water and citral are also effective. The use of about one to two grams of water per 100 grams of citral is especially preferred. The water may be added to the mixture of citral, palladium and base. Water may also be added together with the palladium catalyst, as for example in the form of 5 percent palladium-on-carbon catalyst containing 50 percent water which is a convenient, free-flowing powder and is commercially available. When a small amount of water is added, say one gram per 100 grams citral, or when the water is added as wet palladium-on-carbon catalyst it does not form a separate phase. Large amounts of water will, however, not dissolve or be absorbed on the catalyst carrier and will form a two-phase liquid system which has not been found to be detrimental to the process.

Among the bases which may be employed in accordance with the present invention, the following may be mentioned:
1. inorganic bases including
   a. strong bases
   b. moderately strong bases and
   c. weak bases and very weak bases,
2. organic bases, such as amines, preferably tertiary amines including
   a. acyclic tertiary amines and homocyclic tertiary amines
   b. heterocyclic tertiary amines (ie: those having the amine nitrogen as part of a cyclic system, including unsaturated and saturated heterocyclic amines.) There may be utilized inorganic bases as follows:
1a. The strong bases ($pK_b^{25} < 1$). These include the hydroxides of alkali metals, for example lithium, sodium and potassium hydroxides. Also included in this group are compounds which are converted into these hydroxides on contact with water. Among this group may be named alkali metal hydrides, alkali metal acryls and alkyls, and alkali metal alcoholates, for example sodium hydride, lithium hydride, butyl lithium, phenyl lithium, potassium methoxide and the like.
1b. A second group of bases are the moderately strong bases varying from about $pK_b^{25}$ 1.0 to $pK_b^{25}$ 4. These include alkaline earth metal hydroxides such as calcium hydroxide and non-hydrated oxides such as silver and lead oxides.
1c. The third group of bases are the weak ($pK_b^{25}$ 4 – 5) and very weak bases ($pK_b^{25} > 5$). These include hydroxides such as ammonium hydroxide and the salts of strong bases with weak or very weak acids. For the purposes of this definition a strong base has a $pK_b^{25} < 1$, a weak acid has $pK_a^{25} > 1$. It is understood that only those salts which have a $pK_b^{25} > 4$ are included and that some bases included in the first and second group can be produced by reacting a sufficiently strong base with a sufficiently weak acid.

The strong bases are those defined more specifically above. The weak and very weak acids include, but are not limited to, inorganic acids such as carbonic, boric and, silicic acids. However, the salts chosen should be sufficiently soluble in water to produce a pH>8 at a concentration of 10g salt/100g water. However, in the category of weak acids it is preferred to use organic acids much as carbonic (which can be classed as such) formic, acetic, benzoic, citric, ascorbic, and succinic acids.

It is to be understood that the above classifications are for purposes of convenience and indication of the preferred components only.

The second group of bases which may be utilized are organic bases. All organic bases may be used, that is to say compounds having a C—N bond wherein the nitrogen atom effectively has a free electron pair. These bases may be broadly classified as primary, secondary and tertiary amines and include saturated and unsaturated acyclic homocyclic and heterocyclic amines. While amides could be used, the $pK_b^{25}$ of most amides is too high to achieve satisfactory results. It has been found that while primary and secondary amines may be used, tertiary amines are especially preferred.

Primary and secondary amines could react with the aldehyde. The quantities used are of such an order that the yield will not be appreciably reduced. It has been found that the use of primary and secondary amines gives a product which is superior in yield and purity to that obtained from use of a wet catalyst without base. However the yield and purity is not as good as that obtained from tertiary amines. The tertiary amine of choice is triethyl amine since it is cheap and a stable article of commerce. Other tertiary amines which may be used include acyclic and homocyclic tertiary amines as well as heterocyclic amines the last being those wherein the nitrogen atom forms part of the cyclic moiety.

The organic bases include:
2a. Acyclic and homocyclic tertiary amines, among which maybe mentioned: trialkyl amines, trialkarylamines, triaryl amines and amines having mixed substituents; for example, trimethyl amine, tripropylamine, tributylamine, tribenzylamine, tritolylamine, triphenylamine, trinaphthylamine, dimethylphenylamine, diphenylethylamine, dibenzylmethylamine and the like.

The organic bases also include:
2b. The cyclic tertiary amines namely the unsaturated heterocyclic amines. For example, there may be included: N-alkyl pyrroles such as N-ethyl pyrrole, N - aryl pyrazoles such as N - phenyl pyrazole, pyridine, quinoline, and the nuclearly substituted derivatives thereof. Also included are the unsaturated heterocyclic tertiary amines such as N - alkyl pyrrolidine, N,N'-diaryl piperazines such as N,N' -dinaphthyl piperazine and N - alkyl morpholines such as N - ethyl morpholine.

As stated above, there may also be used primary and secondary amines, although these are not preferred.

Thus there may be used acyclic and homocyclic primary amines such as alkylamines, aryl amines, aralkylamines and alkyl amines for example methylamine, ethylamine, aniline, benzylamine, toluidine and the like.

There may also be used the corresponding groups of N,N-disubstituted (i.e. secondary) amines for example dialkylamines, diarylamines, diaralylamines and dialkarylamines as well as amines substituted by a combination of said substituent groups such as diethylamine, dipropylamine, diphenylamine, dinaphthylamine, dibenzylamine and dixylylamine as well as methyl phenylamine, phenylnaphthylamine, propylbenzylamine and the like.

As secondary amines there may also be included the non substituted analogs of the saturated cyclic amines mentioned above as well as the unsubstituted analogs of those unsaturated cyclic amines mentioned above as being N - substituted. For example: pyrrolidine, piperidine, piperazine, morpholine, pyrrole and pyrazole may be used.

The quantity of base used varies inversely as the strength of the base. The range of based used lies between 0.1 and 10 grams of base per 100 grams of citral. Thus when a strong base, such as sodium hydroxide is used between about 0.1 and about 0.5 grams are preferred. A moderately strong base such as sodium carbonate calls for from about 1 to about 3 grams of base, and a weak base such as triethylamine requires from about 4 to about 8 grams of base. Although primary and secondary amines are not the amines of choice, when used, from 1.5 to 5, but preferably not exceeding 5 grams of base should be employed. All of the above quantities being relative to 100 grams of citral charged.

The above listing of organic amines is not intended to be limiting. It is set forth for purposes of illustration only, it being understood that one skilled in the art could readily find other bases which could fall within the general classification and be operative.

Using the above-mentioned catalyst and conditions, the hydrogenation is rapid and specific. Hydrogen absorption stops when about the stoichiometric amount of hydrogen has been added. The hydrogenation may be conducted at from about 5° to about 150°C at pressures of from about 5 to about 600 psi. We prefer to operate the process at about 25°–40°C and about 40–50 psi. The reaction product contains more than 96 percent citronellal, less than 4 percent dimethyloctanal, a trace of citral, and no isopulegol or citronellol.

The advantages of the process and invention are clearly shown by comparison with an experiment using Raney nickel as catalyst. In this case the hydrogenation rate did not slow down when the stoichiometric amount of hydrogen for converting citral to citronellal was absorbed and hydrogenation continued if allowed. The composition of the oil when the hydrogenation was stopped after the stoichiometric amount of hydrogen had been absorbed was 2 percent dimethyloctanal, 55 percent citronellal, 25 percent citronellol and 18 percent citral.

The advantages of using a combination of water and a base with the palladium are outstanding. Dry palladium on carbon is a poor catalyst for the hydrogenation of citral to citronellal. The catalyst is slowly deactivated by high concentrations of citral, and to effect absorption of one mole of hydrogen it is necessary to make two or three additions of dry palladium on carbon catalyst. As the hydrogenation progresses and the concentration of the citral drops below about 10 percent the catalyst remains active but loses its selectivity and a considerable amount (22 percent) of dimethyloctanal is formed. Palladium on carbon plus water without the base or palladium on carbon plus base without the water are also poor catalysts. The oil from the former system when the hydrogen absorption stops contains 2.1 percent DMA, 33.7 percent citronellal, 5.3 percent isopulegol and 58.9 percent citral. The latter when the hydrogen absorption stops contains 8.0 percent DMA, 80 percent citronellal and 12 percent citral.

It is an additional advantage of the present process that it can be used with citral from both natural and synthetic sources. Excellent results have been obtained with natural citral from lemongrass oil and with synthetic citral prepared by rearrangement of dehydrolinalyl acetate (derived from acetylene) and synthetic citral prepared by oxidation of geraniol (derived from β-pinene via myrcene).

The purity of the citral used is not critical in the process. Excellent results were obtained with pure citral (96 percent) and with crude citrals (70 to 75 percent) from both natural and synthetic sources. Thus, it is possible to start with crude citral and avoid the cost or purifying the starting material.

Citronellal prepared by our process can be used without further purification for certain manufacturing purposes such as the preparation of hydroxycitronellal. If a purified form of citronellal is desired it can be obtained by distilling the hydrogenation product.

EXAMPLE I

Pure citral, (76 grams), 2 grams of wet 5 percent palladium on carbon (50% $H_2O$) and 1 gram of sodium carbonate was hydrogenated at 27°–30°C and 40–50 psi of hydrogen. After 5 hours the hydrogen absorption stopped. The oil was filtered and the reaction product analyzed as follows:

Purity by oximation: 94.3 percent
VPC analysis: 3.7 percent dimethyloctanal, 96.2 percent citronellal,
  0.1 percent citral, no citronellol or
  isopulegol The pure citral utilized was obtained from lemongrass oil and had the following compositions:
1. Purity 95.5 percent by oximation
2. By gas-liquid chromatography (VPC)
   Neral: Geranial = 33:67

In accordance with the above procedure, but where in place of sodium carbonate there is utilized dilute aqueous sodium hydroxide the same product is obtained in substantially the same degree of purity.

EXAMPLE II

Pure citral (76 Grams), from the same source as utilized in Example I, 1 gram of dry 5 percent palladium on carbon, 1 gram of water and 1 gram of sodium carbonate was hydrogenated at 45°–50°C and 40–50 psi of hydrogen. After 3.5 hours the hydrogen absorption stopped. The reaction product had the following analysis:

Purity by oximation 94.5 percent
VPC analysis: 3.4 percent DMA, 96.5 percent citronellal
  0.1 percent citral, no citronellol or
  isopulegol.

In accordance with the above procedure but where, in place of sodium carbonate there is utilized calcium hydroxide, the same product is obtained in substantially the same degree of purity.

EXAMPLE III

Pure citral (76 Grams), (from the same source as utilized in example I), 2 grams of wet 5 percent palladium on carbon (50% $H_2O$) and 1 gram of sodium carbonate was hydrogenated at various temperatures and pressures. The conditions and results are shown in Table I.

TABLE I

| Temp° C | PSIG | Time hrs | Purity by oximation | V.P.C. | | | | |
|---|---|---|---|---|---|---|---|---|
| | | | | DMA | Citronellal | Citral | Citronellol | Isopulegol |
| 26 | 5–10 | 15 | 94 | 3.1 | 96.6 | 0.3 | 0.0 | 0.0 |
| 50 | 40–50 | 4 | 94 | 3.9 | 95.8 | 0.3 | 0.0 | 0.0 |

EXAMPLE IV

Pure citral (100 Grams), from the same source as utilized in Example I), 1.3 grams of dry 5 percent palladium on alumina, 1.3 grams of water and 1.3 grams of sodium carbonate, was hydrogenated at 35°–40°C and 40–50 psi of hydrogen. After 7½ hours the hydrogen absorption stopped. The reaction product had the following analysis:

Purity by oximation 93.1 percent

VPC analysis: 1.8 percent DMA, 96.8 percent citronellal,
1.4 percent citral, no citronellol or isopulegol.

In accordance with the above procedure but where in place of sodium carbonate there is utilized ammonium hydroxide; potassium acetate or sodium benzoate, the same product is obtained in substantially the same degree of purity.

EXAMPLE V

Crude citral, (2,000 grams), 40 grams of wet 5 percent palladium on carbon (50% $H_2O$) and 40 grams of sodium carbonate was hydrogenated at 30°C and 45 psi of hydrogen. After 5 hours the hydrogen absorption stopped. The oil was filtered and the reaction product had the following analysis:

Purity by oximation 81.4 percent
V.P.C. analysis: 5.4 percent DMA, 93.6 percent citronellal
1.0 percent, no citronellol or isopulegol The crude synthetic citral utilized was prepared from dehydrolinalyl acetate and had the following analysis:
1. 71.9 percent citral by U.V.
2. 82.7 percent purity by oximation
3. by VPC — Neral: Geranial = 38:62

In accordance with the above procedure but where in place of sodium carbonate there is utilized triethylamine, or dimethylphenylamine, there is obtained the same product in substantially the same degree of purity.

EXAMPLE VI

Crude citral, (2,000 grams), 40 grams of wet 5 percent palladium on carbon (50% $H_2O$) and 60 grams of sodium carbonate was hydrogenated at 30°C and 45 psi of hydrogen. After 5 hours the hydrogen absorption stopped. The oil was filtered and the reaction product had the following analysis:

Purity by oximation 74.6 percent
V.P.C. analysis: 3.6 percent DMA
96.4 percent Citronellal
Max. of 1.9 percent citral by U.V.

Purified citronellal can be recovered from the hydrogenation product by distillation. Using a 1 inch diameter by 9 inch long Goodloe column there was obtained 1,300 grams of 92 percent pure citronellal.

The crude, synthetic citral utilized was obtained from myrcene and had the following analysis:
1. 76 percent Citral by U.V.
2. 77.4 percent Purity by oximation
3. By VPC:

Neral: Geranial = 30:70

In accordance with the above procedure but where, in place of sodium carbonate there is utilized pyridine, quinoline, N - methylpyrrole, or N - methylpiperidine, there is obtained the same product in substantially the same degree of purity.

EXAMPLE VII

Citral (83 grams), 2 grams of wet 5 percent palladium on carbon (50% $H_2O$) and 1 gram of sodium carbonate was hydrogenated at 45°C. and 40–50 psi of hydrogen. After 6 hours the hydrogen absorption stopped. The oil produced was filtered and the reaction mixture had the following analysis:

V.P.C. analysis: 3.4 percent DMA 96.6 percent Citronellal
0.6 percent Citral by UV
Purity of oximation: 88.5 percent Citral utilized was obtained by vacuum distillation of lemongrass oil and had the following analysis:
1. 91 percent by oximation
2. V.P.C. ratio Neral: geranial = 33.67

EXAMPLE VIII

Pure citral, (100 grams) (from the same source as utilized in example I) was hydrogenated at 35°C and 40–50 psi of hydrogen until the hydrogen absorption stopped. The conditions and results are shown in Table II.

TABLE II

| Catalyst | | Sodium Carbonate grms | Time hrs | V.P.C. | | | | Purity by oximation |
|---|---|---|---|---|---|---|---|---|
| grms wet* | grms dry** | | | DMA | Citronellal | Isopulegol | Cirtal | |
| 2. | — | 0.0 | 4 | 2.1 | 33.7 | 3.5 | 60.7 | 90.4 |
| 2. | — | 1.0 | 4 | 3.8 | 95.5 | 0.0 | 0.7 | 94.5 |
| — | 1+1+1 | 0.0 | 6 | 22.0 | 70.0 | 3.5 | 4.5 | 91.0 |
| — | 1+1 | 1.0 | 6 | 8.0 | 80.0 | 0.0 | 12 | 94.0 |

*Wet 5% Palladium on carbon (50% $H_2O$)
**Dry 5% Palladium on carbon

A study of Table II clearly shows the advantage of our process. Dry 5 percent palladium on carbon alone or with sodium carbonate are poor catalysts: wet 5 percent palladium on carbon (50% $H_2O$) without the sodium carbonate is a poor catalyst.

What is needed is a combination of palladium on carbon, water and base for the successful hydrogenation of citral to citronellal.

EXAMPLE IX

Pure citral, (100 grams), (from the same source as utilized in example I) was hydrogenated at 35°–40°C and 40–50 psi with 1 gram of 5 percent palladium on dry carbon and 1 gram of sodium carbonate using varying amounts of water until the hydrogen adsorption stopped. The results are shown in Table III.

TABLE III

| Grms $H_2O$ | Time Hrs | V.P.C. | | | | Purity by oximation |
|---|---|---|---|---|---|---|
| | | DMA | Citronellal | Isopulegol | Citral | |
| 0.2 | 2 | 1.3 | 42.6 | 0.0 | 56.1 | |
| 0.5 | 5 | 4.5 | 94.8 | 0.0 | 0.6 | 93.7 |
| 1.3 | 4 | 3.4 | 96.4 | 0.0 | 0.2 | 94.3 |
| 5.0 | 14 | 4.2 | 95.4 | 0.0 | 0.4 | 93.5 |

Table III clearly shows the advantage of using water in combination with 5 percent palladium on dry carbon and base. A two phase system resulted when 5 grams of water was used.

EXAMPLE X

Pure citral, (100 grams), (from the same source as utilized in example I) was hydrogenated at 40–50 psi of hydrogen with various bases until the hydrogen absorption stopped. The conditions and results are shown in Table IV.

TABLE IV

| Catalyst | | Base grms | Temp° C | Time Hrs | Purity by Oxi- mation | V.P.C. | | | |
|---|---|---|---|---|---|---|---|---|---|
| grms wet* | grms dry** | | | | | DMA | Cit- ron ellal | Iso- pulegol | Cit- ral |
| 2 | — | Sodium carbonate 1, | 35 | 4 | 94.5 | 3.8 | 95.5 | 0.0 | 0.7 |
| 2 | — | Triethyl amine 5, | 38 | 9 | — | 4.4 | 94.9 | 0.0 | 0.6 |
| — | 2 | Sodium Hydroxide 1, of 10% aqueous | 30 | 3 | 93.6 | 4.4 | 95.1 | 0.0 | 0.5 |

*Wet 5% palladium on carbon (50% H₂O)
**Dry 5% palladium on carbon

EXAMPLE XI

Pure citral, (152 grams), (from the same source is utilized in example I) and 5 grams of Raney nickel type catalyst were hydrogenated at 70°C and 50 psi hydrogen pressure. In 6½ hrs. about the stoichiometric amount of hydrogen for hydrogenation of citral to citronellal had been added. The reaction product, by VPC, showed the following analysis:
DMA 2 percent, Citronellal 55 percent, Citral 18 percent and
Citronellol 25 percent.

The above example clearly shows the poor selectivity of the Raney nickel type catalyst for the hydrogenation of citral.

What is claimed is:

1. A process for the preparation of citronellal which comprises hydrogenating citral in the presence of a catalyst consisting essentially of palladium, water and a base at between about 5°C and about 150°C and a pressure of between about 5 psi and about 600 psi the minimum amount of water being about 0.3 grams of water per hundred grams of citral and the amount of base being between 0.1 and 10 grams of base per 100 grams of citral.

2. A process according to claim 1 wherein the base is selected from the group consisting of alkali metal hydroxides, alkaline earth metal hydroxides, salts of strong bases with weak acids and amines.

3. A process according to claim 2 wherein the salts of strong bases with weak acids are alkali and alkaline earth metal carbonates, bicarbonates, acetates and benzoates, and the amines are primary, secondary and tertiary amines.

4. A process according to claim 1 wherein the palladium is in the form of palladium deposited on a carrier.

5. A process according to claim 4 wherein the carrier is carbon or alumina.

6. A process according to claim 5 wherein the catalyst consists essentially of
   a. 1–10 percent palladium on carbon or alumina
   b. water
   c. a base selected from the group of bases consisting of alkali metal hydroxides, alkali metal carbonates and tertiary amines.

7. A process according to claim 6 wherein the catalyst used consists essentially of
   a. between 0.2 and 5.0 part by weight of 5 percent palladium on carbon or alumina per 100 parts weight of citral charged
   b. at least 0.3 parts by weight of water per 100 parts of citral charged
   c. between 0.1 and 10 parts by weight of base per 100 parts by weight of citral charged.

8. A process according to claim 6 wherein the hydrogenation is carried out at between about 25° to about 40°C at from about 40 to about 50 psi.

9. A process according to claim 8 wherein there are used
   b. between about 1 to about 2 parts by weight of water
   c. between about 1 to about 3 parts by weight of sodium or potassium carbonate per 100 parts by weight of citral charged.

10. A process according to claim 8 wherein there are used
    b. between about 1 to about 2 parts by weight of water
    c. between about 3–6 parts by weight of triethyl amine per 100 parts by weight of citral charged.

11. A process according to claim 8 wherein there are used
    a. between about 1 to about 2 parts by weight of water
    b. between 0.05 and 0.5 parts by weight of sodium or potassium hydroxide per 100 parts by weight of citral charged.

* * * * *